United States Patent
Chen et al.

(10) Patent No.: US 6,266,732 B1
(45) Date of Patent: *Jul. 24, 2001

(54) INTERRUPT EVENTS CHAINING

(75) Inventors: Edmund Chen, Sunnyvale; Claude Hayek, Mountain View; Jahan Lotfi, Fremont, all of CA (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,484

(22) Filed: May 29, 1998

(51) Int. Cl.[7] ....................................... G06F 13/24
(52) U.S. Cl. ............................................. 710/263
(58) Field of Search ............................. 710/263; 712/244

(56) References Cited

U.S. PATENT DOCUMENTS 3,789,365 * 1/1974 Jen et al. ............................... 710/264
5,361,363 * 11/1994 Wells et al. ............................ 712/22
5,418,970 * 5/1995 Gifford .................................. 712/20

* cited by examiner

Primary Examiner—David Y. Eng
(74) Attorney, Agent, or Firm—Wagner, Murabito & Hao LLP (57) ABSTRACT

A method and system for efficiently servicing a peripheral component event. In one embodiment of the present invention, a peripheral component such as, for example, a network interface card generates a first interrupt upon the occurrence of a first peripheral component event. In the present embodiment, a peripheral component driver such as, for example, a network interface card driver then services the first peripheral component event. In this embodiment of the present invention, the peripheral component then services any existing coalesced peripheral component event (or events) which has not yet generated a respective interrupt. In so doing, the present embodiment eliminates the need for the existing coalesced peripheral component event to generate an additional interrupt at some later time. As a result, the present embodiment reduces the frequency with which interrupts are generated, and minimizes the CPU overhead associated with the servicing of interrupts.

27 Claims, 4 Drawing Sheets

INTERRUPT EVENTS CHAINING

TECHNICAL FIELD

The present invention generally pertains to the field of computer networking. More particularly, the present invention is related to interrupt generation by a peripheral component.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

The NIC, like other hardware devices, requires a device driver which controls the physical functions of the NIC and coordinates data transfers between the NIC and the host operating system. An industry standard for interfacing between the device driver and the host operating system is known as the Network Device Interface Specification, or NDIS, which is developed by Microsoft Corporation of Redmond, Wash. The operating system layer implementing the NDIS interface is generally known as an NDIS wrapper. Functionally, the NDIS wrapper arbitrates the control of the device driver between various application programs and provides temporary storage for the data packets.

In one type of prior art system, in order for a NIC to communicate with or access the CPU, an interrupt must be generated. In such a prior art approach, hardware on the NIC generates an interrupt when the NIC has an event to be serviced. Each these aforementioned interrupts has substantial CPU overhead associated therewith. That is, every time an interrupt is generated, the CPU must: cease performing its current selected task; store relevant data, pointers, and the like; service the event(s) which triggered the interrupt; and return to the selected task. With the advent of high speed applications and environments such as, for example, Gigabit Ethernet or asynchronous transfer mode (ATM), data is being transferred from and arriving at the NIC at much higher rate. As a result, of the higher data transfer speeds, the generation of interrupts by the NIC becomes increasingly frequent. In fact, conventional hardware based interrupt generation schemes could result in the NIC almost continuously asserting interrupts to the CPU of the host computer. Under such circumstances, the overhead associated with servicing each interrupt triggering event becomes prohibitively excessive. That is, prior art interrupt generation approaches do not optimally minimize CPU utilization and overhead.

In an attempt to alleviate the problem of excessive CPU utilization and overhead due to frequent interrupt generation, one prior art approach employs interrupt coalescing. In such an approach, groups of events (e.g. transmit complete events, receive complete events, and the like) are stored or "coalesced", and a single interrupt is generated once a selected number of the events are obtained. That is, instead of generating an interrupt each time a transmit complete event occurs, an interrupt coalesced approach only generates an interrupt when, for example, five transmit complete events have been coalesced. In such an approach, CPU overhead associated with servicing transmit complete events is reduced. As an example, in order to service five transmit complete events in a non-coalesced approach, the CPU must cease performing its current selected task; store relevant data, pointers, and the like; service only a single transmit complete event; and return to the selected task on five separate occasions. However, to service five coalesced transmit complete events, the CPU will cease performing its current selected task; store relevant data, pointers, and the like; service all five coalesced transmit complete events; and return to the selected task on only one occasion. Although interrupt coalescing can reduce CPU utilization and overhead, interrupt coalescing alone is not sufficient to meet the needs of current peripheral components such as NICs. That is, even with interrupt coalescing, excessive CPU utilization and overhead problems still exist.

Thus, a need exists for a peripheral component interrupt generation system which reduces the frequency with which interrupts are generated. A need also exists for a peripheral component interrupt generation system which minimizes the CPU overhead associated with the servicing of interrupts. Still another need exists for a peripheral component interrupt generation system which meets the above-listed needs and which operates effectively in a coalesced interrupt environment.

DISCLOSURE OF THE INVENTION

The present invention provides a peripheral component interrupt generation system which reduces the frequency with which interrupts are generated. The present invention also provides a peripheral component interrupt generation system which minimizes the CPU overhead associated with the servicing of interrupts. The present invention further provides a peripheral component interrupt generation system which meets the above-listed needs and which operates effectively in a coalesced interrupt environment. The above accomplishments are achieved with a peripheral component interrupt generation system which chains coalesced interrupts.

Specifically, in one embodiment, the present invention, a peripheral component such as, for example, a network interface card generates a first interrupt upon the occurrence of a first peripheral component event. In the present embodiment, a peripheral component driver such as, for example, a network interface card driver then services the first peripheral component event. In this embodiment of the present invention, the peripheral component then services any existing coalesced peripheral component event (or events) which has not yet generated a respective interrupt. In so doing, the present embodiment eliminates the need for the existing coalesced peripheral component event to generate an additional interrupt at some later time. As a result, the present embodiment reduces the frequency with which interrupts are generated, and minimizes the CPU overhead associated with the servicing of interrupts.

In another embodiment, the present invention includes the features of the above embodiment, and further explicitly recites that upon the generation of the first interrupt, the peripheral component then services a plurality of separately coalesced peripheral component events even though none of the groups of separately coalesced peripheral component events has yet generated a respective interrupt. Thus, multiple different groups of various coalesced peripheral component events are serviced upon the generation of the first interrupt. In so doing, the present embodiment eliminates the need for the existing coalesced peripheral component events of the various groups to generate respective additional interrupts at some later time. As a result, the present embodiment, like the previous embodiment, reduces the frequency with which interrupts are generated, and minimizes the CPU overhead associated with the servicing of interrupts.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "storing", "servicing", "coalescing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INTERRUPT EVENTS CHAINING INVENTION

Figure 1:
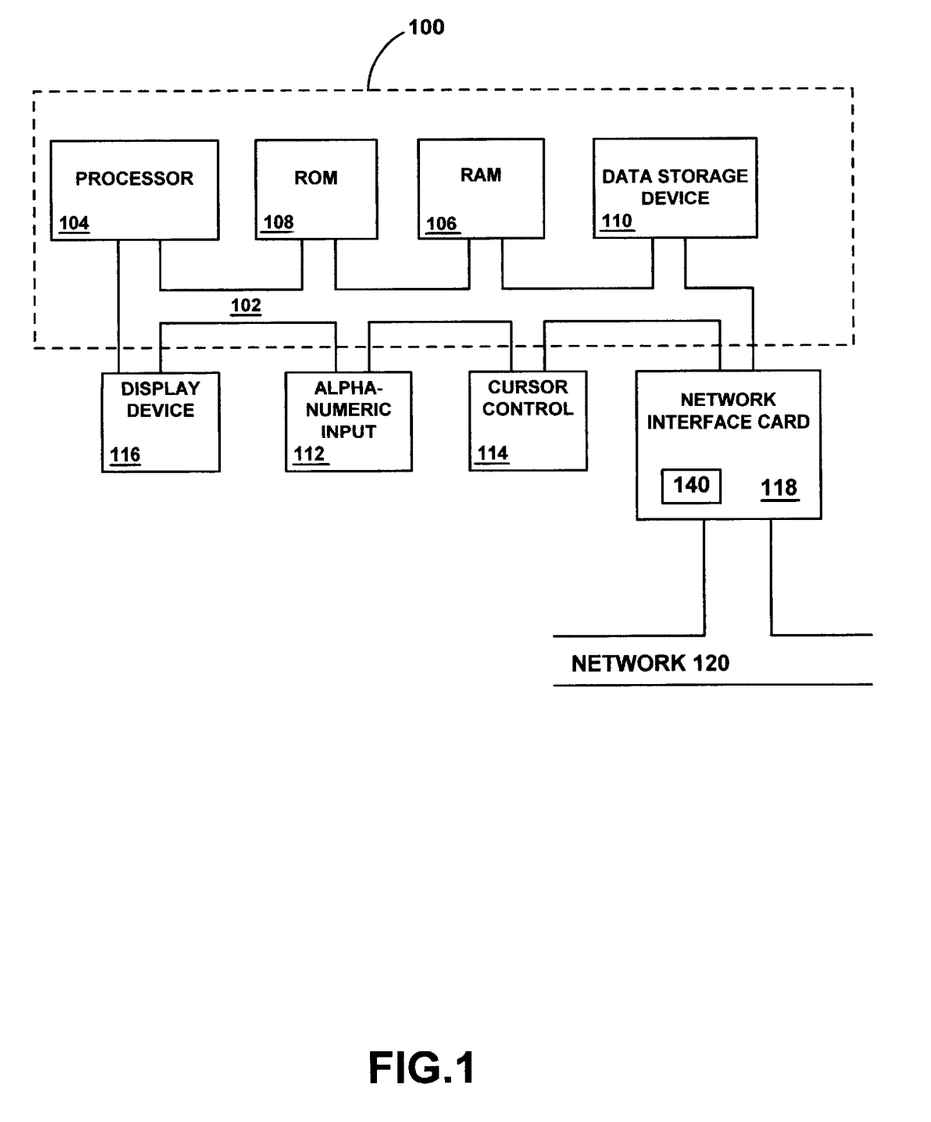
FIG. 1 is a schematic diagram of an exemplary computer system used to perform steps of the present interrupt events chaining method in accordance with one embodiment of the present invention.

With reference now to FIG. 1, portions of the present interrupt events chaining method and system are comprised of computer-readable and computer-executable instructions which reside, for example, in computer-usable media of a computer system. FIG. 1 illustrates an exemplary computer system 100 used to perform the interrupt events chaining method in accordance with one embodiment of the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the interrupt events chaining method and system embodiments of the present invention are found below.

With reference still to FIG. 1, significantly, a network interface card (NIC) 118 coupled to bus 102 is connected to a network 120 and controls the flow of information over network 120. Data packets, such as Ethernet packets, that are incoming arrive at NIC 118 via network 120 and are stored in FIFO memory 140 of NIC 118 before being transferred to other hardware and software of computer system 100. A more detailed discussion of NIC 118 in furtherance of the present invention is found below.

Figure 2:
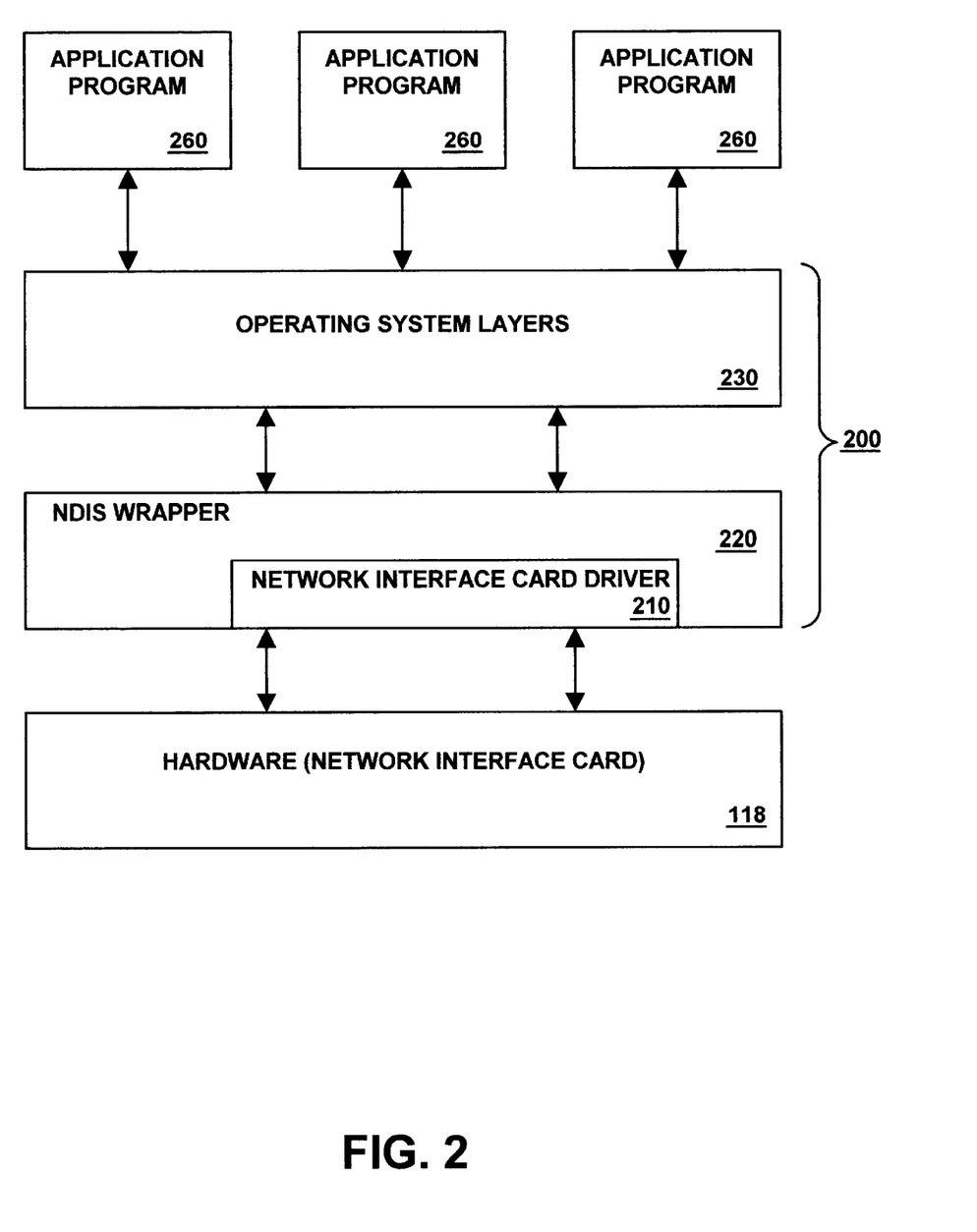
FIG. 2 is a schematic diagram of different operating layers associated with the computer system as illustrated in FIG. 1 in furtherance of one embodiment of the present invention.

Referring next to FIG. 2, a block diagram that represents the different layers of a host operating system 200 operable on computer system 100 of FIG. 1 is shown. Host operating system 200 includes a network interface card driver 210 that operates NIC 118 and moves data packets between NIC 118 and other hardware and software of computer system 100. Implemented directly above network interface card driver 210 is a network device interface specification (NDIS) wrapper 220. FIG. 2 further includes a schematic representation of operating system layers 230. NDIS wrapper 220 primarily arbitrates the control of network interface card driver 210 between various application programs, typically shown as 260.

Figure 3:
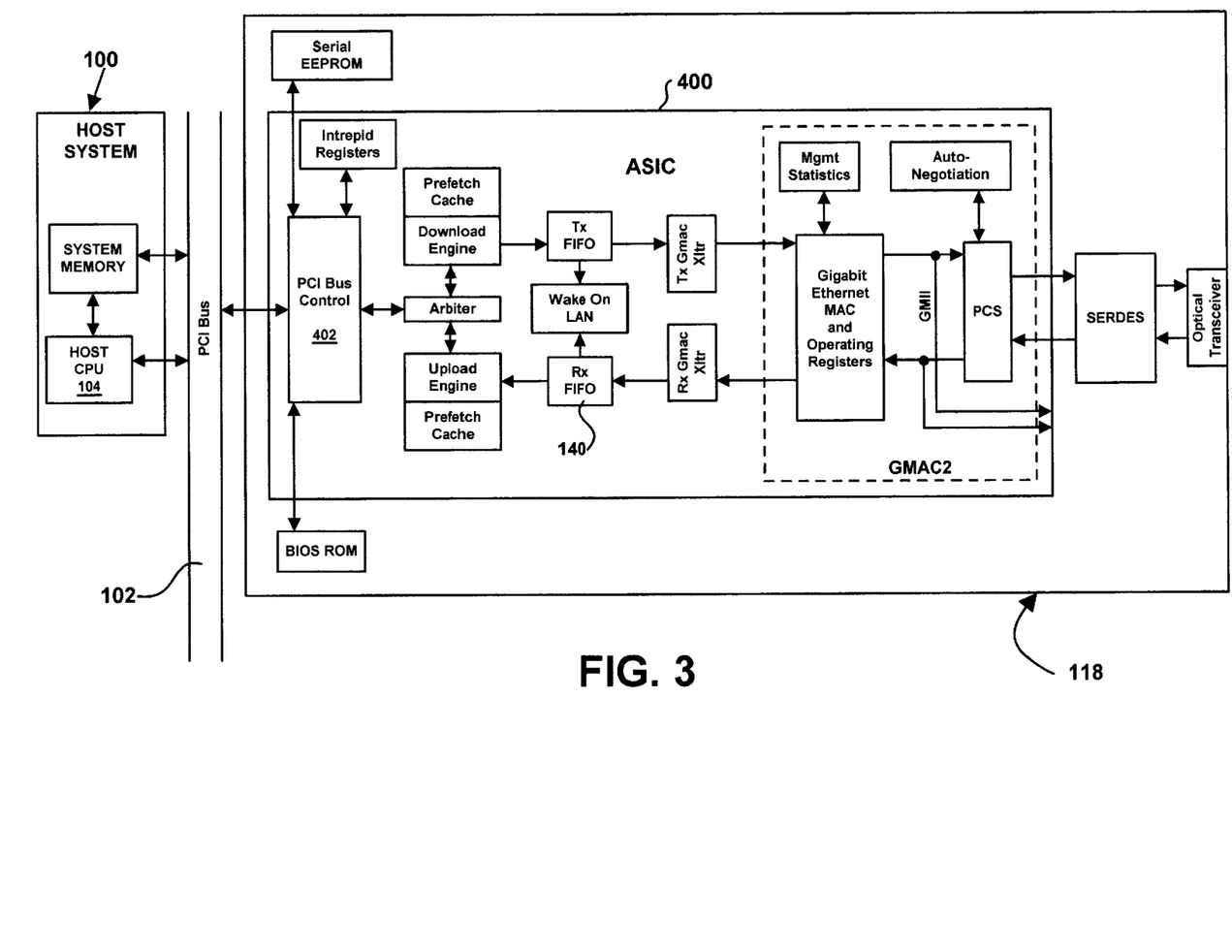
FIG. 3 is a schematic diagram of a host computer system having a network interface card coupled thereto in accordance with one embodiment of the present claimed invention.

Referring now to FIG. 3, a schematic diagram of a host computer system 100 having a network interface card 118 coupled thereto is shown. In the embodiment of FIG. 3, network interface card 118 includes a network interface card ASIC (application specific integrated circuit) 400, which contains various components and features. Although such a specific implementation is shown in the embodiment of FIG. 3, the present invention is also well suited to an embodiment having various other components and features.

GENERAL DESCRIPTION OF THE PRESENT INTERRUPT EVENTS CHAINING INVENTION

Figure 4:
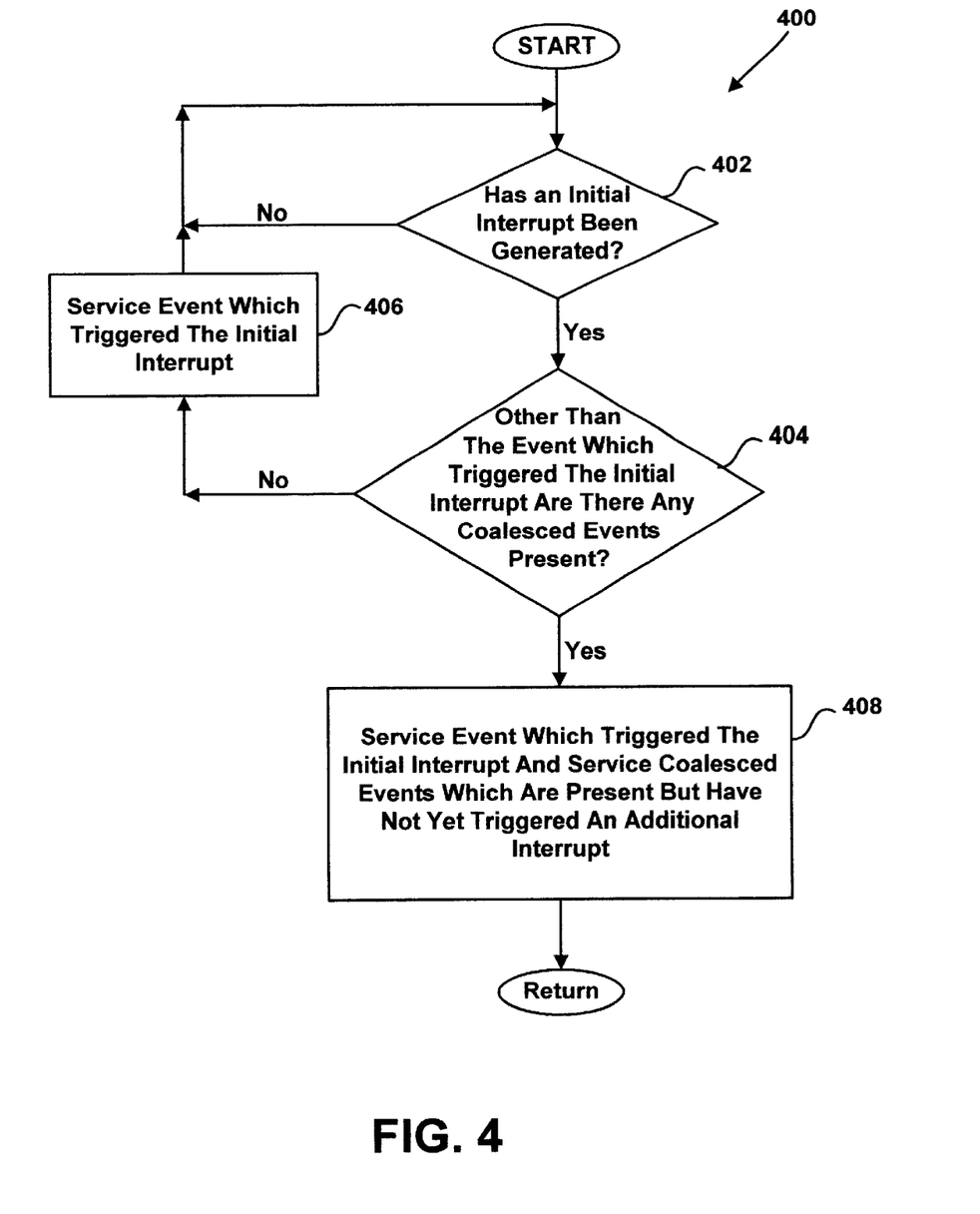
FIG. 4 is a flow chart of steps performed in one implementation of an interrupt events chaining method in accordance with one embodiment of the present claimed invention.

With reference next to FIG. 4, an flow chart 400 of exemplary steps used by the present invention is shown.

Flow chart 400 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control or operate in conjunction with, for example, central processing unit 104 of FIGS. 1 and 3, host operating system 200, and network device driver 210 both of FIG. 2. Although specific steps are disclosed in flow chart 400 of FIG. 4, such steps are exemplary. That is, the present invention is well suited to performing various other steps or variations of the steps recited in FIG. 4.

In step 402 of FIG. 4, in one embodiment of the present invention, network interface card driver 218 of FIG. 2 first determines whether an interrupt has been generated by the network interface card (NIC) 118 of FIGS. 1–3. In the following description of embodiments of the present invention, the peripheral component driver is a network interface card driver. Additionally, in the following description of embodiments of the present invention, the peripheral component is a network interface card. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver. Additionally, the present invention is well suited to use in an embodiment in which the peripheral component is, for example, a rate controller, a small computer system interface (SCSI) controller, a graphics card, and the like.

Referring still to step 402 of FIG. 4, in the present embodiment, NIC 118 of FIGS. 1–3, generates an initial or first interrupt signal upon the occurrence of peripheral component event. For example, once NIC 118 has an event such as a completed transmission of data (i.e. a transmit complete event), NIC 118 will generate an interrupt. Although a single event (a transmit complete event) triggers the generation of the first interrupt in this embodiment, the present invention is also well suited to an embodiment in which a coalesced group of events triggers the generation of a first interrupt. In such an embodiment, events such as, for example, transmit complete events, are stored or "coalesced", and a single interrupt is generated once a selected number or quantity of the transmit complete events are obtained. Sometimes the selected number or quantity of events required to trigger the generation of an interrupt is referred to as a "watermark". Thus, instead of generating the first or initial interrupt each time a single transmit complete event occurs, in one embodiment of the present invention, the initial interrupt will only be generated when, for example, five transmit complete events have been coalesced. Hence, the present invention is well suited to an embodiment in which the initial interrupt is generated upon the occurrence of a single peripheral component event or upon reaching a watermark of coalesced peripheral component events.

With reference still to step 402 of FIG. 4, in the present embodiment, when so triggered, NIC 118 causes the generation of interrupts via PCI (peripheral component interconnect) bus control logic 402. It will be understood that in the embodiment of FIG. 4, PCI bus control logic 402 is employed to control access to and use of PCI bus 102. Although NIC ASIC 400 is configured as shown in FIG. 4, it will be understood that the present invention is also well suited to various other configurations for NIC ASIC 400. Additionally, in the following description of the present embodiments, NIC 118 generates interrupts for and communicates with host computer 100, both of FIGS. 1 and 3, via PCI bus 102. Although the present embodiments specifically recite the use of a PCI bus, the present invention is also well suited to an embodiment employing various other busses. That is, the present invention is well suited to an embodiment in which the bus is, for example, a USB (universal serial bus), an ISA (industry standard architecture) bus, a SCSI (small computer systems interface) bus, an IEEE (Institute of Electronics and Electrical Engineers, Inc.) 1394 serial bus, an EISA (extended industry standard architecture) bus, and the like.

Referring still to step 402, if an initial interrupt has not yet been generated, the present embodiment returns to step 402 and continues determining whether an initial interrupt has been generated. If, on the other hand, an initial interrupt has been generated, the present embodiment proceeds to step 404. The following exemplary list recites several examples of interrupts which may be generated by NIC 118 and subsequently recognized in step 402 of the present embodiment:

IntLatch [31]: This bit is represents the bitwise OR of all the interrupt bits after the IntEnable<31> filter has been applied. This bit represents the equivalent of the inverse of the PCI INT#line.

StatusOverflow [29]: This bit indicates that one or more of the statistics counter is nearing an overflow condition. Reading all of the statistic registers will acknowledge this bit.

rxOverRun [28]: When set indicates that the internal Receive FIFO has overflowed and packet(s) have been discarded.

txIndication [26]: When set, indicates that a Transmit Status Descriptor (TSD) has been posted to the Transmit Status Queue (txSQ) in system memory txSQ.

rxIndication [25]: When set, indicates that a Receive Status Descriptor (RSD) has been posted to the Receive Status Queue (rxsQ).

txSQentry [24]: This bit is used to indicate that there are Transmit Status Descriptor (TSD) entries in the Transmit Status Queue (txSQ). This bit will only be set if the txIndication bit is also set. The driver can use this bit to prevent redundant interrupts when all TSD entries have already been processed.

rxSQentry [23]: This bit is used to indicate that there are Receive Status Descriptor (RSD) entries in the Receive Status Queue (rxSQ). This bit will only be set if the rxIndication bit is also set. The driver can use this bit to prevent redundant interrupts when all RSD entries have already been processed.

GmacInt [11]: When set, indicates that the GMAC2 core is generating an interrupt.

pmeEvent [10]: When this bit is set, the PowerMgmtEvent<15:0> register should be examined for further detail.

LostLink [9]: When set, indicates that receive synchronization has been lost.

LinkStatusChange [8]: When set, indicates that a change in the link status has occurred.

CountdownExpire [7]: When set, indicates that the programmed value in the Countdown<15:0> register has expired.

hwError [5]: This bit is set when the hardware detects an error. The specific error detected is reported in the hwErrStatus<31:0> register.

hostError [4]: This bit is set when a catastrophic error related to the bus interface occurs. The errors which set hostError are PCI target abort and PCI master abort. hostError is cleared by issuing a soft reset.

txXon [3]: This bit is set when the NIC has transmitted a XON PAUSE packet.

txXoff [2]: This bit is set when the NIC has transmitted a XOFF PAUSE packet.

rxPaused [1]: This bit is set when the Transmit Path has been paused due to a reception of a XOFF PAUSE frame. When the pause time has expired or a XON PAUSE frame is received, then this bit is cleared.

txPause [0]: This bit is set when the NIC transmits a XOFF PAUSE frame due to congestion in the receive first-in first-out buffer (Rx FIFO). This bit is cleared upon read or a subsequent transmit of a XON PAUSE frame.

Although such specific interrupts are recited above, the present embodiment is well suited to recognizing various other interrupts which may be generated by NIC 118.

In step 404, the present embodiment then determines whether, other than the event which triggered the initial interrupt, if there are any coalesced events present which have not yet generated a respective interrupt. That is, the present embodiment determines whether any peripheral component events have occurred, are being coalesced, but have not yet reached an interrupt triggering watermark. As a specific example, in one embodiment, transmit complete events are coalesced. After five transmit complete events have been coalesced, an interrupt is generated. Thus, in such an embodiment, at step 404 the present invention would determine if any transmit complete events have been coalesced. Although a single coalesced group of peripheral component events is mentioned in this example, the present invention is well suited to an embodiment in which a plurality of different peripheral component events are separately coalesced. That is, the present invention is well suited to an embodiment in which, for example, transmit complete events are coalesced, receive complete events are coalesced, and so on. Therefore, in step 404, the present embodiment is well suited to determining whether any of numerous separately coalesced peripheral component events are present. If no coalesced peripheral component events are present, the present embodiment proceeds to step 406.

In step 406 of FIG. 4, the present embodiment services the event which triggered the initial interrupt. As mentioned above, in this embodiment, the initial interrupt may be generated upon the occurrence of a single peripheral component event or upon reaching a watermark of coalesced peripheral component events. Thus, the present embodiment services either the single event, or each of the coalesced events. The present embodiment then returns to step 402 and proceeds as is described above. If at step 404, the present embodiment determines that coalesced events which have not yet reached their watermark are present, the present invention proceeds to step 408.

At step 408, the present invention services the event which triggered the initial interrupt and then also services any coalesced events which are present but which have not yet reached their watermark or triggered their respective interrupt. Hence, the present embodiment "chains" servicing of the coalesced events to servicing of the event which triggered the generation of the initial interrupt. In so doing, the present invention effectively brings interrupts forward in time. That is, instead of waiting for the coalesced events to reach their watermark and generate an interrupt, the present invention services the coalesced events before the reach their watermark.

Referring still to step 408, several substantial benefits are associated with the present invention. As mentioned above, considerable CPU overhead is associated with getting into and out of the interrupt service routine. For example, the CPU must cease performing its current selected task; store relevant data, pointers, and the like; service the event; and return to the selected task. This invention, however, reduces the CPU overhead associated with servicing of the interrupts. Specifically, in the present embodiment, in order service the event which triggered the initial interrupt and the coalesced events, the CPU will cease performing its current selected task; store relevant data, pointers, and the like; service the event which triggered the initial interrupt and service the coalesced events; and return to the selected task on only one occasion. Thus, in step 408 of the present embodiment, the CPU will possibly service several separate events but only experiences the overhead conventionally associated with servicing a single event.

With reference still to step 408, it will be seen that the benefits associated with the present invention are particularly substantial in an instance where numerous separately coalesced events are present in step 404. In one example, the initial interrupt is triggered by a first group of coalesced events reaching their respective watermark. Therefore, in such an example, at step 408 the present invention will service the numerous coalesced events which triggered the initial interrupt. The present invention will also service each of the respective groups of coalesced events which have not yet reached their respective watermark. Thus, in this example, the present invention services numerous events but only experiences the CPU overhead typically associated with servicing a single event.

Therefore, it will be seen that the present interrupt events chaining invention minimizes CPU utilization and overhead due to interrupt generation, maximizes bandwidth and throughput, and makes efficient use of the PCI bus.

Thus, the present invention provides a peripheral component interrupt generation system which reduces the frequency with which interrupts are generated. The present invention also provides a peripheral component interrupt generation system which minimizes the CPU overhead associated with the servicing of interrupts. The present invention further provides a peripheral component interrupt generation system which meets the above-listed needs and which operates effectively in a coalesced interrupt environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A system for servicing a peripheral component event, said system comprising:

a host computer having a peripheral component removably coupled thereto, said host computer adapted to operate a peripheral component driver, said peripheral component driver adapted to cause said host computer to service a first type of peripheral component event upon the generation of a first type of interrupt, in addition, said host computer adapted to service a coalesced second type of peripheral component event, which has not yet generated a second type of interrupt, upon a generation of said first type of interrupt for said first type of peripheral component event so that both of said first type of peripheral component event and said second type of peripheral component event are able to be serviced upon said generation of said first type of interrupt; and said peripheral component adapted to cause the generation of said first type of interrupt upon the occurrence said first type of peripheral component event, said peripheral component further adapted to store said coalesced second type of peripheral component event and generate said second type of interrupt when a selected quantity of said coalesced second type of peripheral component events has occurred.

2. The system for servicing a peripheral component event as recited in claim 1 wherein said peripheral component is a network interface card.

3. The system for servicing a peripheral component event as recited in claim 2 wherein said peripheral component driver is a network interface card driver.

4. The system for servicing a peripheral component event as recited in claim 1 wherein said peripheral component is further adapted to service a plurality of said coalesced second type of peripheral component events, which have not yet generated said second type of interrupt, upon the generation of said first type of interrupt by said first peripheral component.

5. The system for servicing a peripheral component event as recited in claim 1 wherein said peripheral component is further adapted to service a plurality of separately coalesced peripheral component events, each of which has not yet generated a respective interrupt, upon the generation of said first type of interrupt by said first type of peripheral component event.

6. The system for servicing a peripheral component event as recited in claim 1 wherein said generation of said first type of peripheral component event is triggered by having a selected number of coalesced said first type of peripheral component events occur.

7. A method for servicing a peripheral component event, said method comprising the steps of:

a) generating a first type of interrupt upon an occurrence of a first type of peripheral component event; and b) servicing said first type of peripheral component event; and c) servicing a coalesced second type of peripheral component event, wherein said coalesced second type of peripheral component event has not yet generated a second type of interrupt so that both of said first type of peripheral component event and said second type of peripheral component event are able to be serviced upon said generation of said first type of interrupt.

8. The method for servicing a peripheral component event as recited in claim 7 wherein step a) comprises using a peripheral component to generate said first type of interrupt.

9. The method for servicing a peripheral component event as recited in claim 7 wherein step a) comprises using a network interface card to generate said first type of interrupt.

10. The method for servicing a peripheral component event as recited in claim 9 further comprising using a network interface card driver to service said first type of peripheral component event and using said network interface card to service said second type of peripheral component event.

11. The method for servicing a peripheral component event as recited in claim 7 wherein step c) comprises servicing a plurality of said coalesced second type of peripheral component events, which have not yet generated said second type of interrupt, upon the generation of said first type of interrupt by said first type of peripheral component event.

12. The method for servicing a peripheral component event as recited in claim 7 wherein step c) comprises servicing a plurality of separately coalesced peripheral component events, each of which has not yet generated a respective interrupt, upon the generation of said first type of interrupt by said first type of peripheral component event.

13. The method for servicing a peripheral component event as recited in claim 7 wherein step b) comprises servicing said first type of peripheral component event after a selected number of coalesced said first type of peripheral component events has occurred.

14. In a computer system having a processor coupled to a bus, a computer readable medium coupled to said bus and having stored therein a computer program that when executed by said processor causes said computer system to implement a method for servicing a peripheral component event, said method comprising the step of:

a) generating a first type of interrupt upon an occurrence of a first type of peripheral component event; and b) servicing said first type of peripheral component event; and c) servicing a coalesced second type of peripheral component event, wherein said coalesced second type of peripheral component event has not yet generated a second type of interrupt so that both of said first type of peripheral component event and said second type of peripheral component event are able to be serviced upon said generating of said first interrupt.

15. A computer readable memory unit as described in claim 14 wherein step a) of said computer implemented method stored on said computer readable medium further comprises using a peripheral component to generate said first type of interrupt.

16. A computer readable memory unit as described in claim 14 wherein step a) of said computer implemented method stored on said computer readable medium further comprises using a network interface card to generate said type of first interrupt.

17. A computer readable memory unit as described in claim 16 wherein said computer implemented method stored on said computer readable medium further comprises using a network interface card driver to service said first type of peripheral component event and using said peripheral component to service said second type of peripheral component event.

18. A computer readable memory unit as described in claim 14 wherein step c) of said computer implemented method stored on said computer readable medium further comprises servicing a plurality of said coalesced second type of peripheral component events, which have not yet generated said second type of interrupt, upon the generation of said first type of interrupt by said first type of peripheral component event.

19. A computer readable memory unit as described in claim 14 wherein step c) of said computer implemented method stored on said computer readable medium further comprises servicing a plurality of separately coalesced peripheral component events, each of which has not yet generated a respective interrupt, upon the generation of said first type of interrupt by said first type of peripheral component event.

20. A computer readable memory unit as described in claim 14 wherein step b) of said computer implemented method stored on said computer readable medium further comprises servicing said first type of peripheral component event after a selected number of coalesced said first type of peripheral component events has occurred.

21. A computer implemented method of servicing a peripheral component event, said computer implemented method comprising the steps of:

a) generating a first type of interrupt upon the occurrence of a first type of peripheral component event; and b) servicing said first type of peripheral component event; and c) servicing a coalesced second type of peripheral component event, wherein said coalesced second type of peripheral component event has not yet generated a second type of interrupt so that both of said first type of peripheral component event and said second type of peripheral component event are able to be serviced upon said generating of said first type of interrupt.

22. The computer implemented method for servicing a peripheral component event as recited in claim 21 wherein step a) comprises using a peripheral component to generate said first type of interrupt.

23. The computer implemented method for servicing a peripheral component event as recited in claim 21 wherein step a) comprises using a network interface card to generate said first type of interrupt.

24. The computer implemented method for servicing a peripheral component event as recited in claim 23 further comprising using a network interface card driver to service said first type of peripheral component event and using said peripheral component to service said second type of peripheral component event.

25. The computer implemented method for servicing a peripheral component event as recited in claim 21 wherein step c) comprises servicing a plurality of said coalesced second type of peripheral component events, which have not yet generated said second type of interrupt, upon the generation of said first type of interrupt by said first type of peripheral component event.

26. The computer implemented method for servicing a peripheral component event as recited in claim 21 wherein step c) comprises servicing a plurality of separately coalesced peripheral component events, each of which has not yet generated a respective interrupt, upon the generation of said first type of interrupt by said first type of peripheral component event.

27. The computer implemented method for servicing a peripheral component event as recited in claim 21 wherein step b) comprises servicing said first type of peripheral component event after a selected number of coalesced said first type of peripheral component events has occurred.

* * * * *